United States Patent
Lof et al.

(10) Patent No.: US 11,658,979 B2
(45) Date of Patent: *May 23, 2023

(54) SYSTEMS AND METHODS FOR EFFICIENT AND SECURE TEMPORARY ANONYMOUS ACCESS TO MEDIA CONTENT

(71) Applicant: Spotify AB, Stockholm (SE)

(72) Inventors: Henrik Tobias Lof, Stockholm (SE); Marcus Per Vesterlund, Stockholm (SE)

(73) Assignee: Spotify AB, Stockholm (SE)

( * ) Notice: Subject to any disclaimer, the term of this patent is extended or adjusted under 35 U.S.C. 154(b) by 100 days.

This patent is subject to a terminal disclaimer.

(21) Appl. No.: 17/216,465

(22) Filed: Mar. 29, 2021

(65) Prior Publication Data
US 2021/0288967 A1 Sep. 16, 2021

Related U.S. Application Data

(63) Continuation of application No. 16/431,620, filed on Jun. 4, 2019, now Pat. No. 10,992,682, which is a (Continued)

(51) Int. Cl.
*G06Q 20/12* (2012.01)
*G06F 21/10* (2013.01)
(Continued)

(52) U.S. Cl.
CPC ............ *H04L 63/102* (2013.01); *G06F 21/10* (2013.01); *G06F 21/6254* (2013.01);
(Continued)

(58) Field of Classification Search
CPC ........... H04L 2463/101; H04L 2209/60; H04L 2209/603; G06Q 20/1235; G06Q 2220/00; G06Q 2220/10
See application file for complete search history.

(56) References Cited

U.S. PATENT DOCUMENTS 8,763,149 B1 6/2014 Cohen et al.
9,084,071 B2 7/2015 Lisboa
(Continued)

OTHER PUBLICATIONS

Eckersley, P., "How Unique is Your Browser?," Electronic Frontier Foundation, Springer 2010, https://panopticlick.eff.org/browser-uniqueness.pdf, 19 pages.
(Continued)

*Primary Examiner* — Daniel B Potratz
(74) *Attorney, Agent, or Firm* — Morgan, Lewis & Bockius LLP

(57) ABSTRACT

A method for providing access to media content from a media content provider is performed at an electronic device. The method includes receiving, from a client device, a request for access to a media item. The request for access includes a self-describing user-identifier. The method includes, in response to the request for access to the media item, initiating an analysis to determine whether the client device is authorized to access the media item, the analysis including an examination of a media consumption log associated with the client device. The media consumption log stores data representing self-describing user-identifiers. The analysis includes, based on the examination of the media consumption log, detecting multiple requests from different self-describing user identifiers corresponding to the client device to determine whether the client device has reached an access limit and, when the client device has reached the access limit, terminating access to the media item.

13 Claims, 9 Drawing Sheets

Related U.S. Application Data continuation of application No. 15/726,274, filed on Oct. 5, 2017, now Pat. No. 10,313,354, which is a continuation of application No. 14/250,312, filed on Apr. 10, 2014, now Pat. No. 9,787,687.

(60) Provisional application No. 61/810,682, filed on Apr. 10, 2013.

(51) Int. Cl.
*H04L 9/40* (2022.01)
*H04L 9/08* (2006.01)
*G06F 21/62* (2013.01)

(52) U.S. Cl.
CPC ......... *G06Q 20/1235* (2013.01); *H04L 9/088* (2013.01); *H04L 63/0421* (2013.01); *G06F 2221/2117* (2013.01); *G06F 2221/2137* (2013.01); *H04L 2209/60* (2013.01)

(56) References Cited

U.S. PATENT DOCUMENTS

| | | | |
|---|---|---|---|
| 2002/0077985 A1* | 6/2002 | Kobata | G06F 21/10 713/189 |
| 2005/0075895 A1 | 4/2005 | Mohsenin et al. | |
| 2005/0192863 A1 | 9/2005 | Mohan | |
| 2005/0268100 A1 | 12/2005 | Gasparini et al. | |
| 2007/0124805 A1 | 5/2007 | Zhou et al. | |
| 2007/0214087 A1 | 9/2007 | Kawaguchi et al. | |
| 2007/0261108 A1* | 11/2007 | Lee | H04N 21/6582 348/E7.06 |
| 2008/0301437 A1* | 12/2008 | Chevallier | H04N 21/47202 348/E7.071 |
| 2009/0106413 A1 | 4/2009 | Salo et al. | |
| 2009/0183264 A1 | 7/2009 | Chmaytelli et al. | |
| 2010/0106965 A1 | 4/2010 | Ross et al. | |
| 2010/0192210 A1 | 7/2010 | Purdy, Sr. et al. | |
| 2010/0325707 A1 | 12/2010 | Iverson et al. | |
| 2012/0060031 A1 | 3/2012 | Huang et al. | |
| 2012/0191582 A1 | 7/2012 | Rance et al. | |
| 2013/0152221 A1* | 6/2013 | Yin | G06F 21/10 726/31 |
| 2014/0082366 A1 | 3/2014 | Engler et al. | |
| 2014/0215350 A1* | 7/2014 | Kosslyn | H04N 21/472 715/745 |
| 2015/0180873 A1 | 6/2015 | Mooij et al. | |

OTHER PUBLICATIONS

Google, "Developer Guide-Protocol Bufferes," Google Developers, Apr. 10, 13, http://developers.google.com/protocol-buffers/docs/overview, 4 pages.

Lof, Office Action, U.S. Appl. No. 14/250,312, dated May 13, 2016, 22 pgs.

Lof, Final Office Action, U.S. Appl. No. 14/250,312, dated Nov. 30, 2016, 30 pgs.

Lof, Office Action, U.S. Appl. No. 14/250,312, dated Apr. 3, 2017, 37 pgs.

Lof, Notice of Allowance, U.S. Appl. No. 14/250,312, dated Aug. 23, 2017, 9 pgs.

Lof, Office Action, U.S. Appl. No. 15/726,274, dated Sep. 10, 2018, 14 pgs.

Lof, Notice of Allowance, U.S. Appl. No. 15/726,274, dated Jan. 24, 2019, 10 pgs.

Lof, Notice of Allowance, U.S. Appl. No. 16/431,620, dated Dec. 30, 2020, 10 pgs.

* cited by examiner

Content Server
132

| User Identifier | Type |
| --- | --- |
| user1234 | Conventional |
| FirstLast99 | Conventional |
| Musicguy | Conventional |
| KNYG65DJMZ4SA2LTEBTXEZLBOQQSAU3QN52GSZTZEBUXGIDH OJSWC5BBEBJXA33UNFTHSIDJOMQGO4TFMF2CCICTOBXXI2LGP EQGS4ZAM5ZGKYLUEEQFG4DPORUWM6JANFZSAZ3SMVQXIIJA KNYG65DJMZ4SA2LTEBTXEZLBOQQQ==== | Self Describing |

Figure 5A

| 508 | 510 | 512 | 514 |
| --- | --- | --- | --- |
| Key Index | Hash Message Authentication Code (HMAC) | Initialization Vector | Profile |

Figure 5B

| Key Index | HMAC Keys | Encryption Keys |
| --- | --- | --- |
| 1 | HMAC-key1 | AES-key1 |
| 2 | HMAC-key2 | AES-key2 |
| 3 | HMAC-key3 | AES-key3 |

Figure 5C

| | Field Description | Value |
|---|---|---|
| 520 | Assigned UUID | ##### |
| 522 | Major UUID Version | ##### |
| 524 | Minor UUID Version | ##### |
| 526 | Country | ##### |
| 528 | Requested Product Type | ##### |
| 530 | Referer URL | ##### |
| 532 | Time Stamp | ##### |
| 534 | Applicable Licenses | ##### |
| 536 | Advertisements? | ##### |
| 538 | Client Application Version | ##### |
| 540 | Client Fingerprint | ##### |
| 542 | IP Address | ##### |
| 544 | Client Application UUID | ##### |
| 546 | Padding | ##### |

Figure 5D

```
message Profile {
optional bytes uuid = ##;
optional int32 major_version = ##;
optional int32 minor_version = ##;
optional string country = ##;
optional string product = ##;
optional string referer = ##;
optional string time_of_creation = ##;
optional int32 licenses = ##;
optional int32 ads = ## [default = 1];
optional string client_version = ##;
optional string fingerprint = ##;
optional string local_ip = ##;
optional string local_app = ##;
optional bytes padding = ##;
}
```

Figure 5E

SYSTEMS AND METHODS FOR EFFICIENT AND SECURE TEMPORARY ANONYMOUS ACCESS TO MEDIA CONTENT

RELATED APPLICATIONS

This application is a continuation of U.S. Non-Provisional application Ser. No. 16/431,620, filed Jun. 4, 2019, entitled "Systems and Methods for Efficient and Secure Temporary Anonymous Access to Media Content," which is a continuation of U.S. Non-Provisional application Ser. No. 15/726,274, filed Oct. 5, 2017, (now U.S. Pat. No. 10,313,354), entitled "Systems and Methods for Efficient and Secure Temporary Anonymous Access to Media Content," which is a continuation of U.S. Non-Provisional application Ser. No. 14/250,312, filed Apr. 10, 2014, (now U.S. Pat. No. 9,787,687), entitled "Systems and Methods for Efficient and Secure Temporary Anonymous Access to Media Content," which claims priority to U.S. Provisional Patent Application No. 61/810,682, entitled "Systems and Methods for Efficient and Secure Temporary Anonymous Access to Media Content," filed Apr. 10, 2013, all of which are incorporated by reference herein in their entireties.

TECHNICAL FIELD

The present disclosure relates generally to offering temporary anonymous access to media content and asynchronously determining limits on media consumption.

BACKGROUND

Modern computers allow users to consume media through computer applications, such as web browsers, media players, and the like. Examples of such media include text, still images, video, and audio. With the technology available today, users expect near instantaneous response when interacting with media providers.

A small delay—even as short as a few seconds—in serving a web page or initiating playback of video or music will often lead to frustration, causing a user to attempt to re-request the content, press a "refresh" button in a browser, or even cause the user to give up on receiving the content and switch to another task. Users are generally more forgiving when accessing media content provided by smaller entities or where the media content is highly desirable. For large commercial media content providers that are earning money based on providing media content to users, however, the user expects a very high level of service, and delays in serving media content can be a direct cause of economic losses.

A user often has to register and "log in" to a commercial media content provider's service before consuming commercial media content from that service. This allows the media content provider to track and limit media consumption by that user, as well as to personalize the user experience. For example, a registered user who is logged in to a service might have a better user experience since media content can be cached in anticipation of listening habits, resulting in a shorter initial delay when playing music. Moreover, advertisements and content suggestions can be tailored for that specific user based on a user profile, usage history, and the like. However, requiring the user to register and/or login is also a barrier to giving the user a seamless experience when the user is not logged in, or not even registered.

To facilitate sharing of media content, such as sharing a link to a particular song through a social networking service, the steps of registering and logging in to a media service should not interfere with users listening to the song. Specifically, when a user follows a link to a song provided by a media service provider, the user experience should be seamless and instantaneous; the music should start playing immediately, even if the user is not logged in to or even registered with the media content provider. However, the anonymous access should be temporary, with the intended goal of converting the anonymous user to a registered and, hopefully, paying user.

If a link to media content is shared through a very large social network, then the number of unregistered users that may attempt to access the media content at substantially the same time and/or within a short period of time may be very high (e.g., in the tens of thousands, or even millions). There are several technical considerations to take into account when designing a system to handle such a load while also providing sufficiently fast response times and maintaining the desired tracking and limiting of media consumption.

A straightforward solution, such as creating a new user account for each access request by each anonymous user, and simply marking the new accounts as "temporary" or "anonymous" will likely lead to a proliferation of user accounts that are used only once. This will increase the user account database size and generally slow down performance of the media content provider. For example, delivery of media content may be delayed while the media content provider creates and stores the temporary user account for the requesting user.

Not using a user account for anonymous users is not satisfactory either, since the media content provider wants to track and limit media consumption by respective users. Accordingly, it is desirable to provide more efficient access to media content for temporary anonymous users.

SUMMARY

Disclosed herein are systems and methods for allowing efficient and secure anonymous access to media content. As noted above, applying traditional user account techniques for potentially millions of anonymous users incurs a cost. For example, simply creating a normal account and marking it as "anonymous" or "temporary" is not ideal, since the user database would have to be cleaned at regular intervals to purge the anonymous user accounts that were used only once and/or are expired or otherwise outdated. Using a separate user account database to store all anonymous accounts is not ideal either, because the increased complexity of the system increases cost and generates additional delays when attempting to look up a particular user. Also, creating a user account in a database, be it the default database or a separate database specifically for anonymous accounts, can result in significant delays when thousands or even millions of anonymous accounts are to be created in a very short amount of time.

Accordingly, systems and methods are described for creating user identifiers that include account information for anonymous users, and for providing asynchronous testing of media consumption limits. Specifically, in some implementations, a system associated with a media content provider implements one or more methods for providing temporary anonymous access to media content stored by and/or associated with the media content provider. For example, in accordance with some implementations, a request for music from an anonymous user (e.g., a user that is not logged in and/or does not have an account with the media content provider) is received by the media content provider. The media content provider determines what and how much music the user is allowed to access. Since the user is not logged in, the request for music cannot be fulfilled while also providing media content tracking and limiting unless the user is associated with a user identifier.

In accordance with some implementations, the media content provider generates a user identifier for the anonymous user and returns the user identifier to the client device associated with the user. The client device (e.g., a web browser or media player, or the like) stores the user identifier, which can be retrieved by the media content provider at a later time. This type of user identifier (also referred to herein as a "self-describing user identifier") is distinguished from other types of user identifiers because it includes account information for the user (e.g., a unique user identifier, a browser fingerprint, etc.), as described herein. Conventional user identifiers are typically created by the user and act simply as a unique identifier for that user's account, as well as a login credential. Notably, because the self-describing user identifier includes account information and is stored on the client device, it does not need to be stored in an account database of the media content provider, thus avoiding the performance penalties incurred by creating and storing anonymous accounts in the account database.

In accordance with an implementation, either immediately after receiving the self-describing user identifier, or at any other appropriate time, the client device supplies the self-describing user identifier to the media content provider. The media content provider then determines that the received user identifier is a self-describing user identifier, verifies its integrity, and extracts account data from the self-describing user identifier instead of looking up the account data in the account database. The extracted account data is then used in determining media access limits and privileges, and the like.

Creation of a self-describing user identifier is fast and efficient, and does not require changes to the account database of the media content provider. In particular, because each self-describing user identifier contains the information needed by the media content provider in order to provide a high quality user experience, and because the user identifiers are stored on the client device ("client") with which they are associated, the media content provider does not need to worry about storing new accounts for each temporary and/or anonymous user that requests media content.

In some implementations, the self-describing user identifier also includes the time of creation of the user identifier, so that access to media content through the self-describing user identifier can be made temporary by having the media content provider reject media access requests associated with self-describing user identifiers that are too old. However a user could acquire a new self-describing user identifier by restarting a web browser, erasing any cookies, or otherwise trying to circumvent media consumption limits. This could allow the user to access media content even though the time of creation of the self-describing user identifier (or any other applicable access limit) would have caused the media content provider to prevent access to the requested content.

In some implementations, such users can be detected by using heuristics that examine media consumption logs to determine whether a request is likely to have originated from a user who is not permitted to access the requested content. For example, though a user may be able to delete a self-describing user identifier that was previously stored on the user's computer (or other type of client device) in order to avoid access limits, it is still possible for the media content provider to determine whether a particular request originated from a known client device. For example, if a subsequent request originated from an identical IP address as a previous request, then it is likely that the subsequent request came from the same device as the previous request. If the first request was associated with an expired self-describing user identifier, and the subsequent request is not associated with any self-describing user identifier (e.g., because the expired self-describing user identifier was deleted by a user), then the media content provider may determine that the subsequent request should be denied.

However, analyzing consumption logs to identify instances where users are attempting to circumvent usage limits takes time, which can result in delayed presentation of media content. Thus, in accordance with some implementations, access to media content is provided immediately (i.e., without waiting for the heuristic analysis to be completed). The limiting service performs the heuristic analysis asynchronously, and limits the media consumption at a later time once the heuristic analysis is complete. As long as the media consumption is limited within a relatively brief period of time (e.g., a few seconds, or up to about a minute), an unauthorized user cannot receive the entire media content item, and the integrity of the media content limits are maintained. At the same time, users who are authorized to receive the media content experience a fast, seamless experience.

EXEMPLARY IMPLEMENTATIONS

In accordance with some implementations, a method for providing access to media content is disclosed. The method is performed at an electronic device having one or more processors and memory storing one or more programs for execution by the one or more processors. The method includes receiving, from a client device, a request for access to a media item. The method further includes obtaining user information associated with a user identifier corresponding to the request. Obtaining the user information includes, if the user identifier corresponds to a first type of user identifier, retrieving the user information from a database; and if the user identifier corresponds to a second type of user identifier different from the first type of user identifier, extracting the user information from the user identifier. The method further includes performing a media access operation based on the request and the user information associated with the user identifier.

In some implementations, the request includes the user identifier.

In some implementations, the method further comprises, prior to obtaining the user information associated with the user identifier, determining whether the request includes the user identifier. In accordance with a determination that the request does not include the user identifier, the method further includes creating the user identifier, and returning the user identifier to the client device.

In some implementations, creating the user identifier includes: compiling the user information; formatting the user information into a predetermined format; and encoding the user information to generate the user identifier.

In some implementations, the user identifier includes one or more of a group consisting of: a country identifier, a product identifier, a referrer identifier, a time stamp, an identifier of a license associated with the client device, an advertisement permission indicator, a version number associated with a client application, a fingerprint corresponding to the client device, a local IP address, and a universally unique identifier of a client application.

In some implementations, creating the user identifier further includes signing the user identifier using a hash-based message authentication code.

In some implementations, the user identifier includes an index and the index is used to select a signing key from a table of signing keys.

In some implementations, creating the user identifier further includes encrypting at least a portion of the user identifier.

In some implementations, the user identifier includes an index and the index is used to select an encryption key from a table of encryption keys.

In some implementations, the media access operation includes limiting media access by the client device based on one or more usage heuristics.

In some implementations, the one or more usage heuristics include identification of one or more conditions selected from the group consisting of: detection of a threshold number of requests sharing a common client fingerprint; detection of downloading patterns of a given user that are indicative of batch downloading; detection of inconsistencies between a geographic location in a given user identifier and a geographic location associated with a corresponding request; detection of multiple different client fingerprints corresponding to a same global IP address/local IP address pair; and detection of multiple different user identifiers using a same universally unique local application identifier.

In some implementations, performing the media access operation includes authorizing provision of the media item to the client device based at least in part on a determination that the user information associated with the user identifier entitles the client device to receive the content.

In some implementations, retrieving the information includes performing a lookup in the database using the user identifier.

In some implementations, extracting the information includes extracting, from the user identifier, information that is not included in the database.

In some implementations, extracting the information includes extracting the information from the user identifier without requesting the information from the database.

In some implementations, the user identifier corresponds to the first type of user identifier if the user identifier includes fewer than a threshold number of characters.

In some implementations, the user identifier corresponds to the second type of user identifier if the user identifier includes more than a threshold number of characters.

In some implementations, the user identifier corresponds to the first type of user identifier if the user identifier is found in the database.

In some implementations, the user identifier corresponds to the second type of user identifier if the user identifier is not found in the database.

In some implementations, the user identifier corresponds to the first type of user identifier if the user identifier does not include one or more predetermined categories of information.

In some implementations, the user identifier corresponds to the second type of user identifier if the user identifier includes one or more predetermined categories of information.

In some implementations, the electronic device is associated with a media content provider, and the user identifier corresponds to the first type of user identifier if the user identifier corresponds to a username associated with an account registered with the media content provider.

In some implementations, the electronic device is associated with a media content provider, and the user identifier corresponds to the second type of user identifier if the user identifier does not correspond to a username associated with any account registered with the media content provider.

In some implementations, performing the media access operation includes: initiating an analysis to determine whether the client device is authorized to access the requested media item; in response to receiving the request for the media item, and without receiving results of the analysis to determine whether the client device is authorized to access the requested media item, providing access to the requested media item; in accordance with a determination, after the client device has been permitted to access the media item, that the client device is authorized to access the media item, permitting continued access to the requested media item; and in accordance with a determination, after the client device has been permitted to access the media item, that the client device is not authorized to access the media item, terminating access to the requested media item.

In some implementations, a client system is provided, the client system comprising: one or more processors; and memory storing one or more programs for execution by the one or more processors, the one or more programs including instructions for performing any of the methods described herein.

In some implementations, a server system is provided, the server system comprising: one or more processors; and memory storing one or more programs for execution by the one or more processors, the one or more programs including instructions for performing any of the methods described herein.

In some implementations, a computer readable storage medium is provided, the computer readable storage medium storing one or more programs, the one or more programs comprising instructions, which, when executed by a system with one or more processors, cause the system to perform any of the methods described herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 5A is a table showing various user identifiers, in accordance with some implementations.

FIG. 5B is a data structure of a self-describing user identifier, in accordance with some implementations.

FIG. 5C is a key table, in accordance with some implementations.

FIG. 5D is a profile template for use in a self-describing user identifier, in accordance with some implementations.

FIG. 5E is a profile string for use in a self-describing user identifier, in accordance with some implementations.

DETAILED DESCRIPTION

Figure 1:
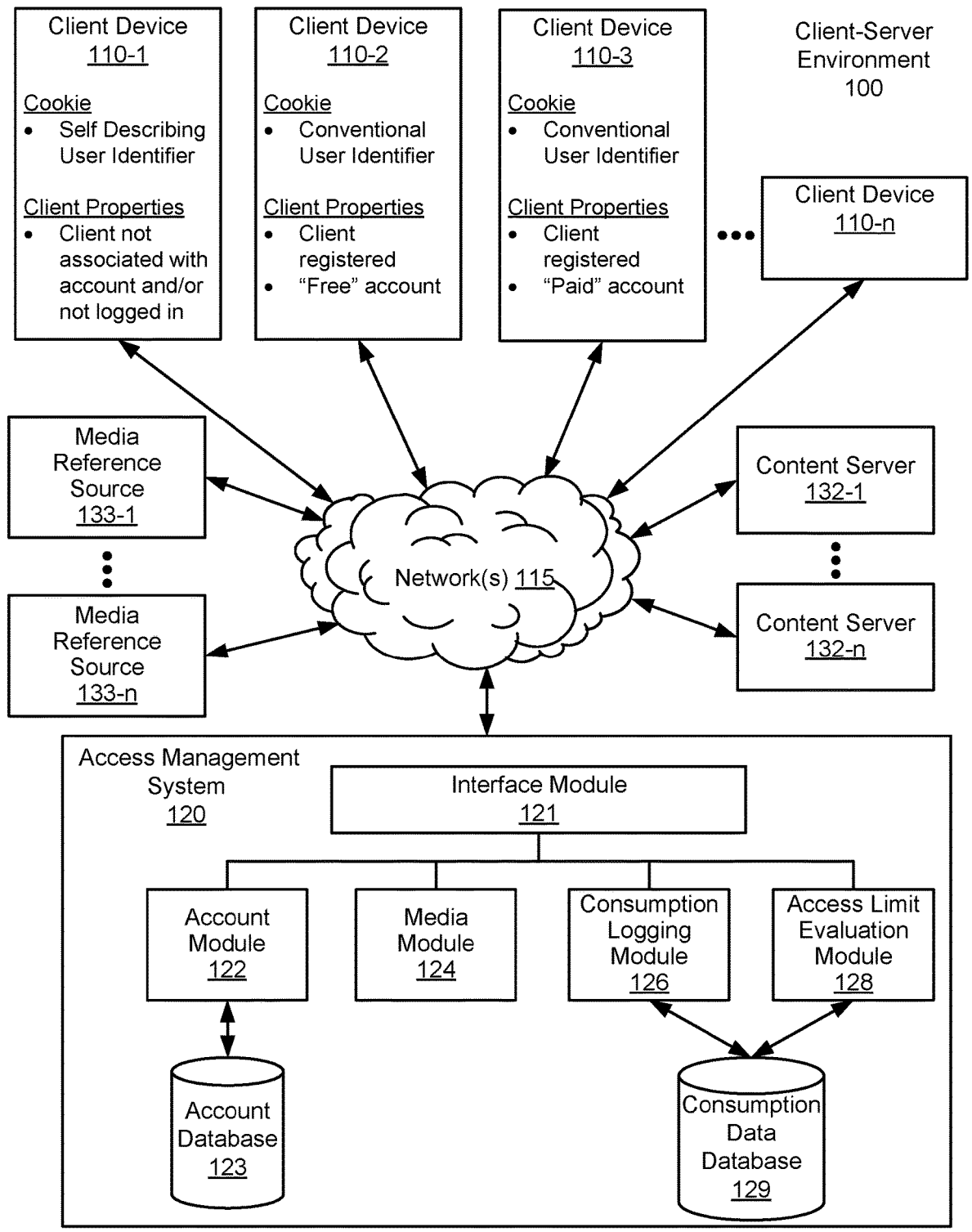
FIG. 1 is a block diagram illustrating a client-server environment in accordance with some implementations.

FIG. 1 is a block diagram of a client-server environment 100 in accordance with some implementations. The client-server environment 100 includes one or more client devices 110 (110-1, . . . , 110-n), one or more access management systems 120, one or more content servers 132 (132-1, . . . , 132-n), and one or more media reference sources 133 (133-1, . . . , 133-n) that are connected through one or more networks 115. The one or more networks 115 can be any network (or combination of networks) such as the Internet, other Wide Area Networks, Local Area Networks, Personal Area Networks, metropolitan area networks, VPNs, local peer-to-peer, ad-hoc connections, and so on.

The client devices 110-n are representative electronic devices associated with respective users. Unless otherwise stated, or if a particular client device is specified, descriptions of a client device "110-n" or "110" apply to any of the client devices 110-n. Also, it is understood that multiple users may be associated with a single client device, and a single user may be associated with multiple client devices.

In some implementations, the client device 110-n is any of: a personal computer, a television, a set-top box, a mobile electronic device, a wearable computing device, a laptop, a tablet computer, a mobile phone, a digital media player, or any other electronic device able to prepare media content for presentation, control presentation of media content, and/or present media content. The client device 110-n communicates with and receive content from content sources such as any of the one or more content servers 132.

In some implementations, the client device 110-n includes a media presentation application (hereinafter "media application") that controls the presentation of media on an output device associated with the client device 110-n. (The output device may be part of the client device 110-n, such as built-in speakers or a screen of a laptop computer, or may be separate from the client device 110-n, such as a television coupled to a set-top box.)

The media application (not shown) is any appropriate program, firmware, operating system, or other logical or physical aspect of the client device 110-n that enables presentation of media content by the client device 110-n (e.g., on an output associated with the client device 110-n). For example, where the client device 110-n is a computer (e.g., laptop computer, tablet computer, mobile phone, etc.), the media presentation application may be a web browser, a video presentation application, a music presentation application, an email application, a media aggregation application, or the like.

The one or more content servers 132 store content and provide the content, via the network(s) 115, to the one or more client devices 110. Content stored by the one or more content servers 132 includes any appropriate content, including text (e.g., articles, blog posts, emails, etc.), images (e.g., photographs, drawings, renderings, etc.), videos (e.g., short-form videos, music videos, television shows, movies, clips, previews, etc.), audio (e.g., music, spoken word, podcasts, etc.), games (e.g., 2- or 3-dimensional graphics-based computer games, etc.), or any combination of content types (e.g., webpages including any combination of the foregoing types of content, or other content not explicitly listed).

The access management system 120 is a representative system associated with a media content provider. The access management system 120 receives media access requests from one or more client devices 110-n, and facilitates access to media content items stored on the one or more content servers 132-n.

In some implementations, the access management system 120 includes an interface module 121, an account module 122, a media module 124, a consumption logging module 126, an access limit evaluation module 128, an account database 123, and a consumption data database 129.

The interface module 121 enables the access management system 120 to communicate with (e.g., send information to and/or receive information from) one or more of the client devices 110 and the content servers 132.

The account module 122 stores, generates, and otherwise manages user accounts of users of a media content provider (e.g., the media content provider associated with the access management system 120). For example, the account module 122 facilitates the registration of users and the creation of user accounts (including conventional user identifiers) for the registered users. The account module 122 also facilitates the creation of self-describing user identifiers (i.e., user identifiers for unregistered or otherwise anonymous users and/or client devices). The account module 122 stores user account data (including, for example, user profiles, conventional user identifiers, etc.) in the account database 123. As described herein, however, in some embodiments, self-describing user identifiers are not stored in the account database 123. This way, it is not necessary to clean the account database 123 to purge the anonymous user accounts that were used only once and/or are expired or otherwise outdated.

The media module 124 receives requests for media content items from the clients 110-n, and determines (e.g., in conjunction with the account module 122 and/or the access limit evaluation module 128) whether the request should be fulfilled. The media module 124 further facilitates client access to requested media content (e.g., by providing or allowing access to media content stored in the access management system or a content server 132-n).

The consumption logging module 126 tracks and logs, in the consumption data database 129, all media consumption by users of the media content provider. For example, the consumption logging module 126 stores data representing each request received from a client device in association with a user identifier associated with that request. The user identifier can be either a conventional user identifier (e.g., a registered user's username) or a self-describing user identifier (e.g., a unique user identifier that is assigned to an unregistered user or to a user who is not otherwise logged in). Such information is used, for example, to generate a user interest profile for respective users, enforce content access limits, and the like.

The access limit evaluation module 128 analyzes consumption data and other information to determine whether a request for media content access by an anonymous client device should be revoked or permitted. For example, the access limit evaluation module 128 performs a heuristic analysis of the consumption data database 129 (and any other appropriate data source) to determine whether a given request is likely to have been issued by a client device that should not be permitted to access the requested media content item (e.g., based on usage limits established by the media content provider).

The one or more media reference sources 133 provide media references to the one or more client devices 110-n. For example, the media reference provider 133 may be, without limitation, a social networking site, a blog entry, an email, a news post, or a mobile phone text message. In some implementations, media references take the form of a uniform resource locator ("URL") that, when executed by the client 110-n, cause the client 110-n to request access to a media content item. In some implementations, the URL of a media reference specifies content and includes an address that identifies the media content provider (e.g., the access management system 120 of the media content provider). As a specific example, a user of a social network may post an entry that says Check out this new song I just found! www.fakedomain.com/newsong.mp3.

The social network (e.g., the media reference source 133-1) makes this post available to other users who may then select the link. When selected by a client device, the client communicates with a computer associated with "fakedomain.com" (e.g., the access management system 120), and requests access to the file "newsong.mp3." This particular URL and file addressing scheme is merely exemplary, and other addressing schemes and file access requests are also contemplated. For example, the URL may not include a request to download a specific file, but may instead cause the media content provider to initiate a streaming content session with the requesting client device.

FIG. 1 illustrates an environment in which a media content provider can offer anonymous client devices a fast and seamless media access experience while maintaining the ability to impose appropriate usage limits. For example, FIG. 1 shows three exemplary client devices 110-1, 110-2, and 110-3 that may request media content from a media content provider.

The first client device, 110-1, is associated with an "anonymous" user—a user that has no account with the media content provider or has an account but is not currently logged in to an account on that particular device. The client device 110-1 may have a cookie (or other token, file, or other data structure) stored thereon that includes a self-describing user identifier. As described herein, this cookie is generated by the media content provider and sent to the client 110-1 in response to a media access request. Thus, the client device 110-1 will only have such a cookie if it has already issued a media access request. Techniques for generating the cookie and the cookie's contents are discussed herein.

As noted above, a user may access a media content provider via multiple different electronic devices, and a single electronic device may be used by multiple different users to access the media content provider. Thus, one particular client device does not necessarily correspond to one particular user, and vice versa. Self-describing user identifiers described herein are stored on, and include data representative of, a particular client device, and thus do not necessarily correspond to a particular user. Moreover, it will be understood that actions described in the instant application as being taken with respect to a user, or information described as representative of or associated with a user, may in fact be associated with a particular client device, and not any particular person.

The first client device 110-1 receives a media reference (e.g., from a media reference source 133), and executes the media reference. For example, the user of the client device 110-1 clicks on a URL in a blog posting in order to request playback of a song. Execution of the media reference causes the client 110-1 to communicate with the media content provider (e.g., the access management system 120) to request the media content. The access management module 120 processes the request, which may include generating a self-describing user identifier for the client 110-1, generating a cookie for the client 110-1, evaluating an existing cookie and/or self-describing user identifier of the client 110-1, determining usage limits applicable to the client 110-1 (including, for example, looking for consumption data associated with a self-describing user identifier from the client 110-1 to determine previous consumption data), and the like. As noted above, usage limits may be determined after the media content provider provides the client 110-1 access to the requested media content. Once the results of the determination are available, the media content provider can either allow the client 110-1 to access the media content or revoke permission to access the media content and terminate the client's access to the media content.

The second client 110-2 is associated with a registered user—a user that has an account with the media content provider and is logged in to the account (i.e., has provided valid login credentials and has established a session with the media content provider). The third client 110-3 is also associated with a registered user. The clients 110-2, 110-3 may have a cookie (or other token, file, or other data structure) stored thereon that includes a user identifier of the registered and logged-in account. Specifically, when users of the clients 110-2, 110-3 logged in to the media content provider, a cookie containing the user identifier (or other data that can be used to identify the clients has having successfully logged in) was generated and stored on the clients 110-2, 110-3. These cookies can then be used to identify returning users.

As shown in FIG. 1, client 110-2 is associated with a "free" account, and client 110-3 is associated with a "paid" account. A "free" account may be associated with a different set of permissions, limits, and features than are afforded to "anonymous" users or "paid" users. For example, a "free" account may present advertisements to a user in exchange for unlimited free access to media content, whereas a "paid" account may allow unlimited free access without advertisements. Moreover, an "anonymous" account may allow only limited, advertisement supported access to media content items. While the present description describes various account types as "free" and "paid," these are merely exemplary of different account types, and may not be associated with any particular type of payment structure. For example, in some cases, different account types (corresponding to different permissions, limits, features, etc.) are based on the age of an account or on any other appropriate factor.

When the clients 110-2, 110-3 request media content from the media content provider (e.g., as a result of a user clicking on a URL received from a media reference source), the clients 110-2, 110-3 communicate with the media content provider (e.g., via the access management system 120) in order to receive the content. The access management system 120 identifies the accounts associated with the requests (e.g., by extracting the respective user identifiers from the respective cookies) and provides access to the requested media content items as appropriate. For example, in response to a request from the second client 110-2, the access management system 120 determines (e.g., with the account module 122), based on the user identifier in the client's cookie, that this particular client is associated with a "free" account and is located in a particular country. Based on this information, the access management system 120 (e.g., with the media module 124) determines whether the client 110-2 is entitled to receive the requested content (e.g., based on the content licenses available for users in various countries), and, if so, provides the requested media content to the client 110-2 along with appropriate advertisements. In some implementations, other permissions, limits, and features are implemented based on the type of account and/or account usage history associated with the client, which can be determined, for example, using the user identifiers associated with and stored on the client. The request and subsequent consumption of the media content is logged by the consumption logging module 126.

In response to a request from the third client 110-3, for example, the access management system 120 determines (e.g., with the account module 122), based on the user identifier in the client's cookie, that this particular client is associated with a "paid" account and is located in a particular country. Based on this information, the access management system 120 (e.g., with the media module 124) determines whether the client 110-3 is entitled to receive the requested content (e.g., based on the content licenses available for users in various countries), and, if so, provides the requested media content to the client 110-3. In some implementations, other permissions, limits, and features are implemented based on the type of account and/or account usage history associated with the client, which can be determined, for example, using the user identifiers associated with and stored on the client. The request and subsequent consumption of the media content is logged by the consumption logging module 126.

In some implementations, when the access management system 120 receives requests from clients, it initially determines what type of user identifier is associated with the requesting client device. Thereafter, the access management system 120 processes the request according to the method established for that type of user identifier. Thus, if the user identifier is a self-describing user identifier, the access management system 120 provides access to the requested media content and asynchronously determines whether the client device associated with the self-describing user identifier is permitted to continue accessing the media content. (Techniques for determining whether the self-describing user identifier is permitted to continue accessing the media content are discussed herein, and include looking up usage history associated with the self-describing user identifier in a consumption data database to determine whether an access limit has been reached, and the like.) If the user identifier is a conventional user identifier, however, the access management system 120 provides or limits access to the requested content in accordance with the typical process for such accounts.

As described herein, the access management system 120 can analyze the user identifier to determine whether it is of a first or a second type. Specifically, each type of user identifier has one or more detectable properties that identify which category it belongs to. For example, in some implementations, conventional user identifiers (sometimes referred to herein as a "first type" of user identifier) have less than or equal to a predetermined number of characters (e.g., 20), and self-describing user identifiers (sometimes referred to herein as a "second type" of user identifier) have more than a predetermined number of characters (e.g., 100). Thus, the access management system 120 can quickly determine whether to process an incoming request according to the process for anonymous users or the process for registered users.

Figure 2:
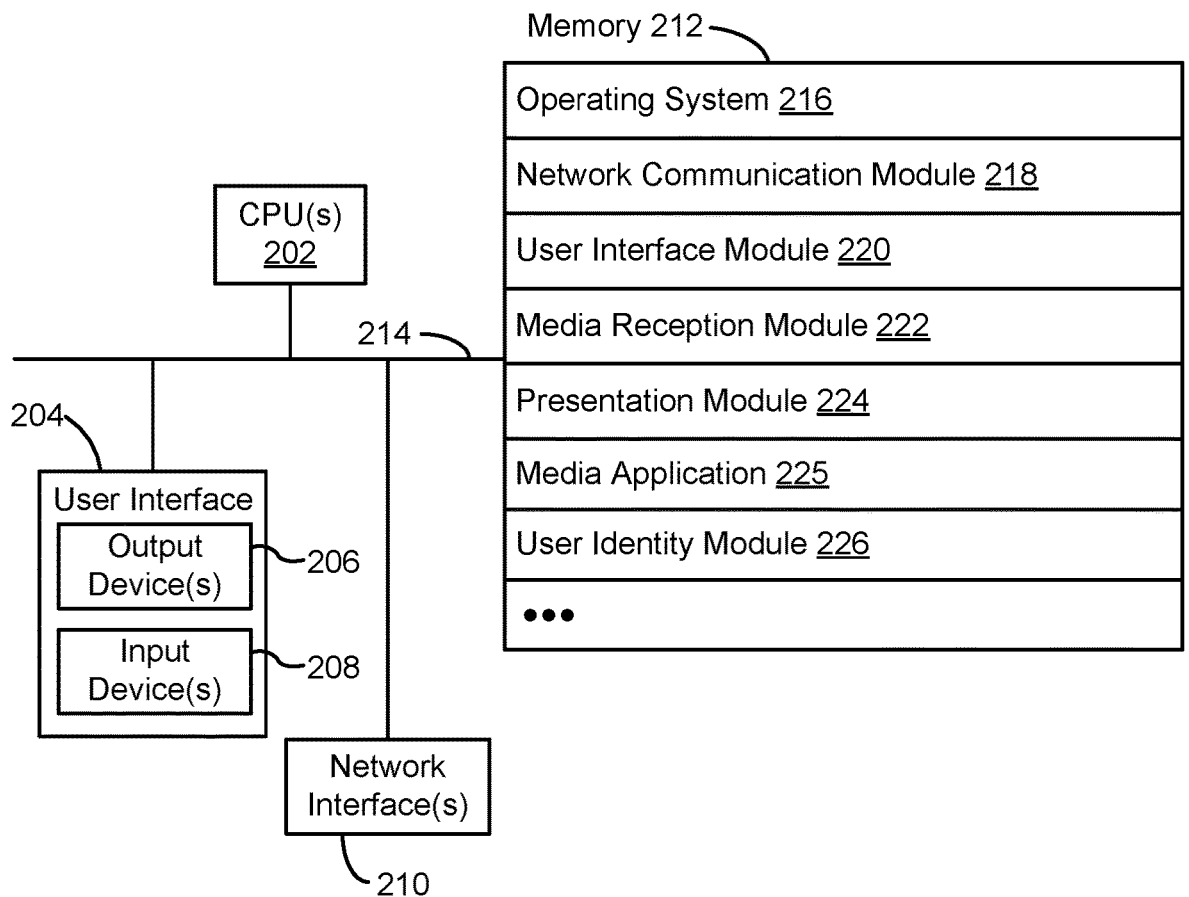
FIG. 2 is a block diagram illustrating a client device, in accordance with some implementations.

FIG. 2 is a block diagram illustrating a representative client device 110 (e.g., client devices 110-1, 110-2, 110-3) in accordance with some implementations. The client device 110, typically, includes one or more processing units/cores (CPUs) 202, one or more network interfaces 210, memory 212, and one or more communication buses 214 for interconnecting these components. The client device 110 includes (or is configured to be connected to) a user interface 204. The user interface 204 includes one or more output devices 206, including user interface elements that enable the presentation of media content to a user, including via speakers or a display. The user interface 204 also includes one or more input devices 208, including user interface components that facilitate user input such as a keyboard, a mouse, a remote control, a voice-command input unit, a touch-sensitive display (sometimes also herein called a touch screen display), a touch-sensitive input pad, a gesture capturing camera, or other input buttons. In some implementations, the client device 110 is a wireless device, such as a mobile phone or a tablet computer. Furthermore, in some implementations, the client device 110 uses a microphone and voice recognition or a camera and gesture recognition to supplement or replace the keyboard.

Memory 212 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 212, optionally, includes one or more storage devices remotely located from one or more CPUs 202. Memory 212, or, alternatively, the non-volatile memory device(s) within memory 212, includes a non-transitory computer readable storage medium. In some implementations, memory 212, or the computer readable storage medium of memory 212, stores the following programs, modules, and data structures, or a subset or superset thereof:

- an operating system 216 that includes procedures for handling various basic system services and for performing hardware dependent tasks;
- a network communication module 218 for connecting the client device 110-1 to other computing devices via the one or more communication network interfaces 210 (wired or wireless) connected to one or more networks 115 such as the Internet, other Wide Area Networks, Local Area Networks, Personal Area Networks, metropolitan area networks, VPNs, peer-to-peer, content delivery networks, ad-hoc connections, and so on;
- a user interface module 220 that receives commands and/or inputs from a user via the user interface 204 (e.g., from the input device(s) 208, which may include keyboard(s), touch screen(s), microphone(s), pointing device(s), eye tracking components, three-dimensional gesture tracking components, and the like), and provides user interface objects and other outputs for display on the user interface 204 (e.g., the output device(s) 206, which may include a computer display, a television screen, a touchscreen, etc.);
- a media reception module 222 for receiving media content (e.g., media content streams, media content files, advertisements, webpages, videos, audio, games, etc.) from a content server 132;
- a presentation module 224 (e.g., a media player, web browser, content decoder/renderer, e-book reader, gaming or other application, etc.) for enabling presentation of media content at the client device 110 (e.g., rendering media content) through output device(s) 206 associated with the user interface 204;

a media application 225 (e.g., a media player, web browser, or any other appropriate application or component of an application) for processing media content (e.g., media content streams, media content files, advertisements, webpages, videos, audio, games, etc.), for providing processed media content to the presentation module 224 for transmittal to the one or more output device(s) 206, and for providing controls enabling a user to navigate, select for playback, and otherwise control or interact with media content; and a user identity module 226 for storing user identity information, such as a user identifier (e.g., a self-describing user identifier, conventional user identifier, or any other appropriate information to identify the user), which may be stored in any appropriate data structure, such as a browser cookie.

Each of the above identified elements may be stored in one or more of the previously mentioned memory devices, and corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 212, optionally, stores a subset of the modules and data structures identified above. Furthermore, memory 212, optionally, stores additional modules and data structures not described above.

Figure 3:
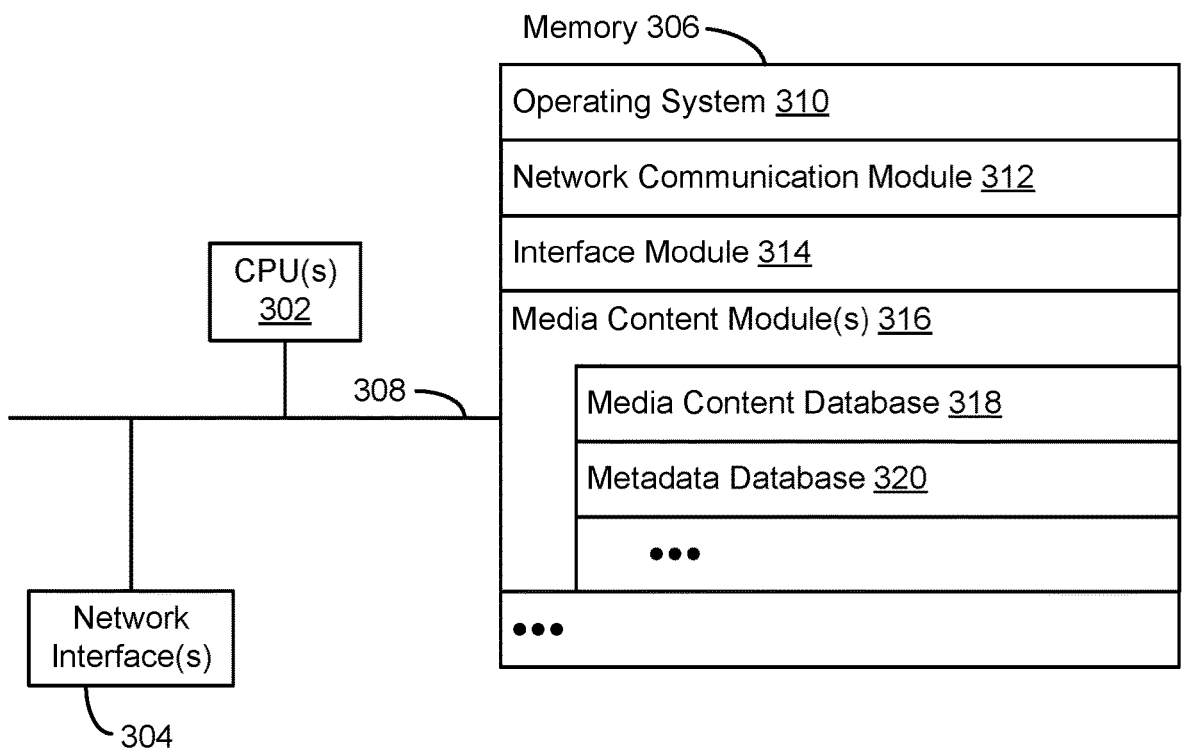
FIG. 3 is a block diagram illustrating a content server, in accordance with some implementations.

FIG. 3 is a block diagram illustrating a representative content server 132 (e.g., content server 132-1) in accordance with some implementations. The content server 132, typically, includes one or more processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 306, optionally, includes one or more storage devices remotely located from one or more CPUs 302. Memory 306, or, alternatively, the non-volatile memory device(s) within memory 306, includes a non-transitory computer readable storage medium. In some implementations, memory 306, or the computer readable storage medium of memory 306, stores the following programs, modules and data structures, or a subset or superset thereof:

an operating system 310 that includes procedures for handling various basic system services and for performing hardware dependent tasks;

a network communication module 312 that is used for connecting the content server 132-1 to other computing devices via one or more communication network interfaces 304 (wired or wireless) connected to one or more networks 115 such as the Internet, other Wide Area Networks, Local Area Networks, Personal Area Networks, metropolitan area networks, VPNs, peer-to-peer, content delivery networks, ad-hoc connections, and so on;

an interface module 314 for sending (e.g., streaming) media content to and receiving information from a client device (e.g., the client device 110-*n*) remote from the sever system 132-1; in various implementations, information received from the client device includes requests from client devices for media content (e.g., requests to download or stream media content, HTTP or HTTPS requests, etc.); and one or more media content module(s) 316 for handling the storage of and access to media content items and metadata relating to the media content items; in some implementations, the one or more media content module(s) 316 include:

a media content database 318 for storing media content items (e.g., webpages, advertisements, audio content, video content, games, interactive content, etc.); and a metadata database 320 for storing metadata relating to the media content items.

Each of the above identified elements may be stored in one or more of the previously mentioned memory devices, and corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 306, optionally, stores a subset or superset of the modules and data structures identified above. Furthermore, memory 306, optionally, stores additional modules and data structures not described above.

Although FIG. 3 shows the content server 132-1, FIG. 3 is intended more as a functional description of the various features that may be present in one or more servers than as a structural schematic of the implementations described herein. In practice, and as recognized by those of ordinary skill in the art, items shown separately could be combined and some items could be separated. For example, some items shown separately in FIG. 3 could be implemented on a single server and single items could be implemented by one or more servers. The actual number of servers used to implement the content server 132-1, and how features are allocated among them, will vary from one implementation to another and, optionally, depends in part on the amount of data traffic that the system must handle during peak usage periods as well as during average usage periods.

Figure 4:
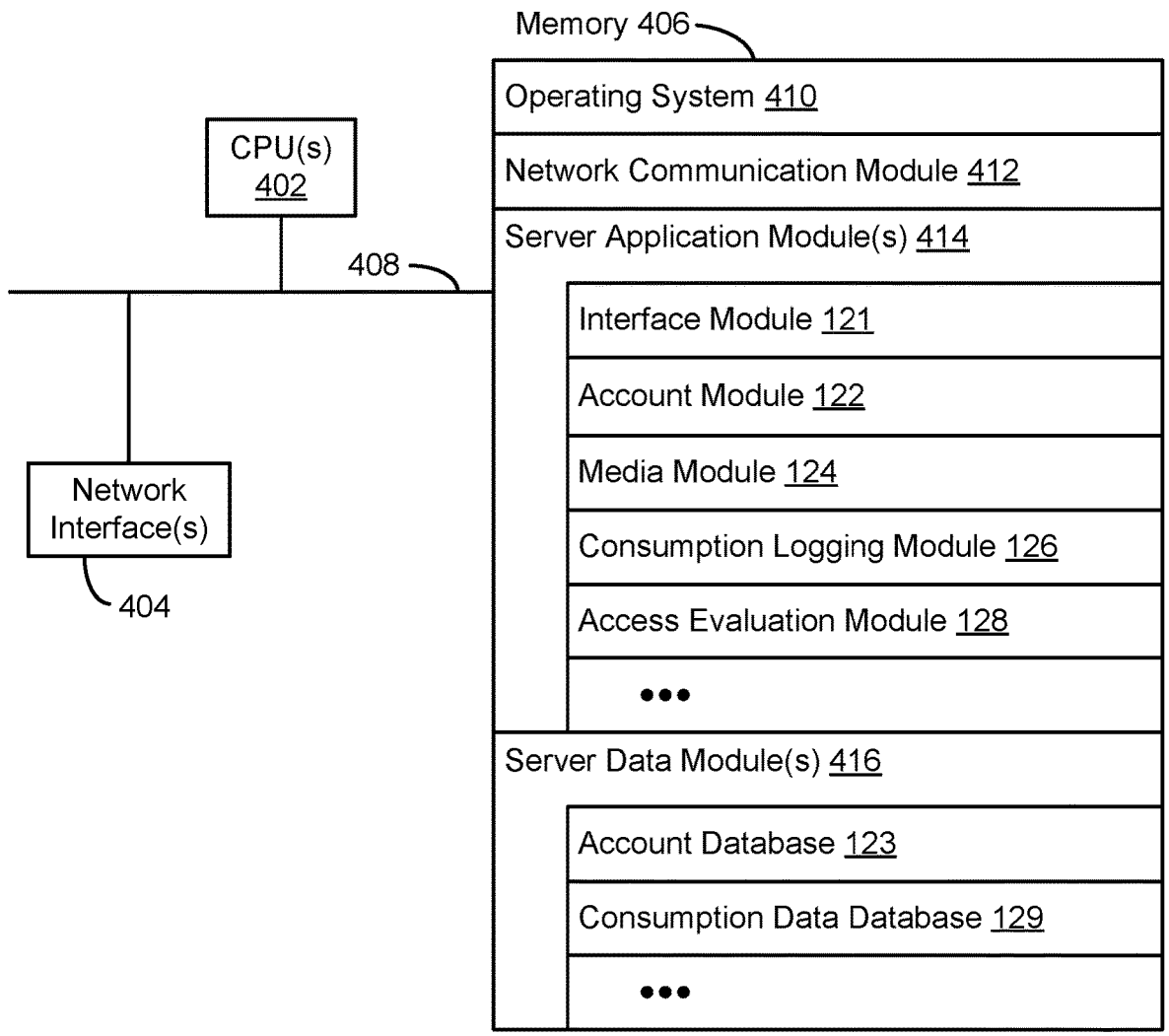
FIG. 4 is a block diagram illustrating an access management system, in accordance with some implementations.

FIG. 4 is a block diagram illustrating an access management system 120 in accordance with some implementations. The access management system 120, typically, includes one or more processing units/cores (CPUs) 402, one or more network interfaces 404, memory 406, and one or more communication buses 408 for interconnecting these components.

Memory 406 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 406, optionally, includes one or more storage devices remotely located from one or more CPUs 402. Memory 406, or, alternatively, the non-volatile memory device(s) within memory 406, includes a non-transitory computer readable storage medium. In some implementations, memory 406, or the computer readable storage medium of memory 406, stores the following programs, modules and data structures, or a subset or superset thereof:

an operating system 410 that includes procedures for handling various basic system services and for performing hardware dependent tasks;

a network communication module 412 that is used for connecting the access management system 120 to other computing devices via one or more communication network interfaces 404 (wired or wireless) connected to one or more networks 115 such as the Internet, other Wide Area Networks, Local Area Networks, Personal Area Networks, metropolitan area networks, VPNs, peer-to-peer, content delivery networks, ad-hoc connections, and so on;

one or more server application modules 414 for enabling the access management system 120 to perform various functionalities, the server application modules 414 including, but not limited to, one or more of:

an interface module 121 for receiving information from one or more client devices (e.g., client devices 110-n), including requests for media content, user identifiers (e.g., cookies containing user identifiers), and other information associated with the requesting client device and/or a user associated therewith;

an account module 122 for receiving user identifiers, determining the type of user identifier (e.g., whether it is a self-describing user identifier or a conventional user identifier), determining limits, permissions, and features associated with user identifiers, generating user self-describing user identifiers, extracting information from a self-describing user identifier, and storing and maintaining user accounts for registered users;

a media module 124 for processing requests for media content, facilitating access to requested media content items by client devices (e.g., the client device 110-n), and limiting continued access to media content by anonymous users under appropriate conditions;

a consumption logging module 126 for tracking and storing (e.g., in the consumption data database 129) media request and consumption history for users of the system, including records of media access requests issued to the media content provider (e.g., all or some of the media access requests), records of media consumption by users (e.g., titles of content items, how long and/or how many times they were consumed by a user, etc.); and an access limit evaluation module 128 for analyzing consumption data (e.g., in the consumption data database 129) and other information to determine whether a request or media content access by an anonymous client should be revoked; and one or more server data modules 416 for storing data related to the access management system 120, including but not limited to:

an account database 123 that stores account information, such as user profiles, login credentials (including user identifiers, passwords, email addresses, etc.), and the like; and a consumption data database 129 that stores consumption data, such as records of media access requests issued to the media content provider (e.g., all or some of the media access requests), and records of media consumption by users (e.g., titles of content items, how long and/or how many times they were consumed by a user, etc.).

Each of the above identified elements may be stored in one or more of the previously mentioned memory devices, and corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 406, optionally, stores a subset or superset of the modules and data structures identified above. Furthermore, memory 406, optionally, stores additional modules and data structures not described above.

Although FIG. 4 shows the access management system 120, FIG. 4 is intended more as a functional description of the various features that may be present in one or more servers than as a structural schematic of the implementations described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement the access management system 120, and how features are allocated among them, will vary from one implementation to another and, optionally, depends in part on the amount of data traffic that the system must handle during peak usage periods as well as during average usage periods.

FIG. 5A illustrates a table 502 of exemplary user identifiers, in accordance with some implementations. For example, table 502 illustrates several conventional user identifiers 503-505 (e.g., "user1234," "FirstLast99," and "musicguy," respectively). As noted above, such user identifiers are generally selected by a user as a "username" or login credential when creating an account with a service (e.g., provided by a media content provider). Moreover, conventional user identifiers, while unique, do not themselves provide any information about the user or the client device with which they are associated. Rather, they are associated with account data (e.g., stored in the account database 123 of the media content provider) that includes such information. When the media content provider needs to know something about a particular user, it can use that user's user identifier to lookup the user's account in the database and extract the desired information.

Frequently, conventional user identifiers are relatively short, both so that they are easier to remember and enter into login fields, and so that they require less storage space. In some cases, a service will even impose character length limits on user identifiers. For example, user identifiers will be limited to 10, 20, 30, 40, 256, or any other suitable number of characters.

Table 502 further illustrates an exemplary self-describing user identifier 506. In this example, the self-describing user identifier 506 is over 100 characters in length, and is not in a human readable form. Rather, as described herein, self-describing user identifiers include encoded information about the user and/or the client device with which it is associated, and are generated by the media content provider rather than being selected by a user. Self-describing user identifiers may be encoded (and/or encrypted) representations of data that characterizes a particular client device. For example, a self-describing user identifier may include a profile that uniquely or semi-uniquely identifies a client device. Thus, instead of linking the self-describing user identifier to an account in an account database, as is the case for conventional user identifiers, all of the information needed by the media content provider to enable temporary anonymous access, while still enforcing usage limits and tracking consumption data, is contained within the self-describing user identifier.

Moreover, detectable differences between the conventional and the self-describing user identifiers can be exploited by a media content provider to help determine how to respond to requests from client devices. For example, if a request is received from a client device that is associated with a conventional user identifier, the media content provider may respond in one manner. If, on the other hand, a request is received from a client device that is associated with a self-describing user identifier, the media content provider may respond in a different manner. Various techniques may be used to determine if a user identifier is of a first type (e.g., conventional) or a second type (e.g., self-describing), as described herein.

FIG. 5B illustrates an exemplary data structure 507 that is used as a basis for generating a self-describing user identifier (e.g., the self-describing user identifier 506, FIG. 5A), in accordance with some implementations. In particular, the data structure 507 includes a key index 508, a hash message authentication code ("HMAC") 510, an initialization vector 512, and a profile 514 associated with the client device for which the self-describing user identifier is being generated (which may be encrypted, as described herein). Once all the elements of the data structure 507 are generated or compiled, they are combined in order to generate a self describing user identifier. For example, in some implementations, a string is formed by concatenating the various fields in the data structure 507, and the string is encoded and/or encrypted to generate a self-describing user identifier (e.g., the user identifier 506). The generated self-describing user identifier is then stored on the client device for which it is generated, for later retrieval and/or analysis by the media content provider.

In some implementations, the media content provider uses one or more techniques to ensure the security of the information in the self-describing user identifier. Such techniques may be used, for example, to ensure that potentially sensitive information contained in the self-describing user identifier is not available to other parties. Moreover, such techniques can be used so that the media content provider can determine whether a self-describing user identifier has been modified or otherwise tampered with by a user or a malicious party. This can help determine whether a user is attempting to circumvent media access limits by modifying a self-describing user identifier to fool the media content provider into thinking that the request is coming from a different user or a different device.

In some implementations, the media content provider encrypts one or more fields of the data structure 507 prior to creating the self-describing user identifier therefrom. For example, the media content provider encrypts the profile 514. This way, other parties will not be able to retrieve a self-describing user identifier from a client device and access the profile information. In some implementations, the profile is encrypted using the advanced encryption standard ("AES") in cipher block chaining ("CBC") mode using an initialization vector.

In some implementations, the initialization vector is a random or pseudo-random string or set of characters.

In some implementations, the media content provider also generates a hash of a portion of the data structure 507 (e.g., the profile 514, the initialization vector 512, or both), and stores the hash value in the self-describing user identifier (e.g., the HMAC 510). The HMAC 510 is used to ensure that a user has not modified or otherwise tampered with the profile 514 (or any other portion of the data structure that is to be authenticated). Specifically, when the media content provider receives a self-describing user identifier from a repeat user, it will check whether the stored hash value 510 matches a newly generated hash value of the profile 514. If the hash values match, then the profile 514 has not been (or is unlikely to have been) tampered with. If they do not match, however, it is likely that the user has attempted to modify the profile 514 (or the self-describing user identifier has become corrupted).

The key index 508 of the data structure 507 is used as an index for either or both of a key for a keyed-hash message authentication code ("HMAC") and a key for an encryption function (e.g., Advanced Encryption Standard, or AES, algorithm). Specifically, when the media content provider encrypts and generates a hash of the profile 514 (and/or any other portion of the data structure 507, or any other appropriate data), it selects an HMAC key and an encryption key from a table of keys, such as the key table 516 shown in FIG. 5C. In this example, each key index corresponds to an HMAC key and an AES key. However, any type of key may be stored in the key table 516, depending on the particular hash and encryption functions being used.

When the media content provider selects an HMAC key and an encryption key from the key table 516, the key index corresponding to those keys is included in the data structure 507 and in the self-describing user identifier. This way, when the media content provider receives a self-describing user identifier from a client along with a media access request, the media content provider can retrieve the keys by looking up the keys in the key table 516 using the key index 508. The media content provider can then confirm the integrity of the self-describing user identifier and decrypt the profile for further processing (e.g., to determine whether to grant the media access request to this particular user or client device). For example, when the media content provider receives a self-describing user identifier, it will retrieve the HMAC and encryption keys from the key table 516. Then, it will use the HMAC key to generate a hash that should match the hash stored in the self-describing user identifier (e.g., a hash of the initialization vector 512 and the profile 514). If the hash values match, then the self-describing user identifier (or at least the initialization vector 512 and the profile 514) is unlikely to have been modified by the user, and the media content provider will proceed accordingly. The media content provider then uses the encryption key retrieved from the key table 516 (or an appropriate decryption key associated with the encryption key) to decrypt the profile 514. The information from the decrypted profile 514 is then used by the media content provider to perform various functions, such as to determine whether the client device associated with the self-describing user identifier is entitled to access the requested content.

In some implementations, the hash algorithm is HMAC-SHA1 which generates a 160-bit hash or "message authentication code" ("MAC"). In some implementations, it is necessary to reduce the size of the self-describing user identifier to a particular size or character limit, so only a subset of the MAC is included in the data structure (e.g., HMAC 510) to be included in a self-describing user identifier. While the resulting loss of precision makes it easier to fake a valid MAC, the overall integrity of the message is still preserved, because if a user has tampered with or modified the encrypted profile 514, the media content provider will not be able to successfully decrypt the profile 514.

Returning to the data structure 507 in FIG. 5B, in some implementations, the profile 514 includes information about the client device that uniquely or semi-uniquely identifies the client device. For example, the profile may include information about the client device that issued an initial request to the media content provider. Such information can be derived from information that is available as a result of a client device contacting the media content provider. In particular, communications between devices over a network (e.g., the Internet) often include certain information about one or both of the devices in communication. For example, an HTTP request (caused by a client device selecting a hyperlink) may include or be accompanied by (or otherwise enable the detection of) information about the client device, such as the type of browser or application that issued the request, the operating system of the client device, the screen resolution of the client device, an HTTP referrer (e.g., the URL of the website that contained the link that was ultimately executed), etc.

As another example, some information about the client device that is not explicitly provided or reported by the client device may also be obtained as a result of a communication between the client device and the media content provider. For example, the media content provider can use geo-location techniques to determine a geographic location of the client device (e.g., the country in which the client device resides). Such techniques include using the IP address of the client device (which can be determined from an HTTP request, for example) to lookup the user's probable location in an IP address database.

In some implementations, once the information in the data structure 507 (or whatever information is desired for a self-describing user identifier) is compiled, the information is encoded into substantially non-human readable form. For example, the data structure is concatenated and encoded using Base32 or Base64 encoding. This will convert the information in the data structure into a character string that includes characters only from a restricted character set (e.g., twenty-six letters and six digits, in the case of Base32). While this transformation renders the self-describing user identifier substantially unreadable by a human, the media content provider can decode the string into a text string that can be parsed for further processing (e.g., to extract data from the self-describing user identifier). Moreover, because the encoding results in a text string having a restricted character set, the string can be represented in "plain text," and can be easily included into a standard browser cookie. Any similar encoding or transformation of the information that constitutes a self-describing user identifier can be used instead of or in addition to Base32 or Base64.

FIG. 5D illustrates an exemplary profile template 517, in accordance with some implementations. One or more fields of the profile template are populated by the media content provider in order to generate a profile 514 for a self-describing user identifier. Specifically, when a client device that does not have a cookie with either a conventional user identifier or a self-describing user identifier requests media content from the media content provider, the media content provider will generate a profile 514 for that client device in accordance with the profile template 517. Individual fields of the profile template 517 are addressed below.

The assigned UUID 520 is a unique user identifier that is generated for each self-describing user identifier. In some implementations, the UUID 520 is generated using the UUID standard, promulgated by the Open Software Foundation. The UUID 520 may be used to associate media consumption data with a particular user (e.g., by the consumption logging module 126, FIG. 1).

The major UUID version 522 identifies the major "version" of the UUID standard that was used to generate the UUID. For example, in some implementations, the UUID 520 is generated using version 4 of the UUID standard. The minor UUID version 524 identifies the minor "version" of the UUID standard that was used to generate the UUID. For example, a sub-version of version 4, such as version 4.1.2, corresponds to a minor version of 1.2.

The country 526 identifies the country within which the client device is located. The particular country is determined using any appropriate technique, such as geo-location techniques using the IP address of the client, and/or as otherwise reported by the client.

The requested product type 528 identifies the type of content that was requested by the client. For example, the requested product type 528 indicates whether the user requested music, video, images, text, images, or any combination of these content types (or others not listed).

The referrer URL 530 identifies a URL of a webpage or website that hosted or provided the link that was selected by the user. For example, if a blog entry on a webpage located at the URL "www.fakeblog.com" includes a link to a media content item of the media content provider (e.g., "www.spotify.com/newsong"), and the user selects the link, the referrer URL 530 will be "www.fakeblog.com". Referrer URLs may be reported to or otherwise available to the media content provider as a result of the user selecting the link in accordance with IP communication and software protocols and standards. (For example, by convention, web browsers may include this information in any HTTP requests that are sent to other devices in response to a user selecting a hyperlink.)

The time stamp 532 indicates a time when the self-describing user identifier was created (e.g., YYYY-MM-DD T ##:##).

The applicable licenses 534 identify which licenses the user can rely on to consume media. In particular, media content licenses acquired by a media content provider may allow only certain users to access the licensed content. For example, a license may only extend to users within a particular country or geographical area. When the media content provider receives a media access request, it determines what licenses are available to that user (e.g., based on the user's location as determined by IP address geo-location), and stores identifiers of the applicable licenses in the profile 514. When subsequent requests are received from that client, the media content provider determines what licenses are applicable by looking up the applicable licenses 534 in the profile 514, rather than redetermining the applicable licenses based on the location of the user, for example.

The advertisements field 536 indicates whether the user should see ads or not (e.g., based on the user's location, the number of times the user has requested media content, etc.). For example, if the user should be presented with ads, the value of the advertisements field may be "1" or "true," and, if ads should not be presented, the value may be "0" or "false."

The client application version 538 is a version number of the client application that issued the media access request. For example, if a user initiates a media access request by selecting a hyperlink in a web browser, the web browser may report its version number (e.g., "FIREFOX, version 3.2.1") to the media content provider. As another example, if a user initiates a media access request by selecting a media content item in a media player/browser application, the media player/browser application may report its version number (e.g., "Spotify Desktop Application, Version 2.1.2") to the media content provider.

The client fingerprint 540 is a collection of information about a client device (or an application of the client device) than can be used to differentiate client devices from each other. For example, the client fingerprint 540 may include characteristics that are detectable as a result of communications between two devices (e.g., a client device and a media content provider). One example of a client fingerprint 540 that is used in some implementations is a browser fingerprint, which includes characteristics of the web browser and/or the client device. Such characteristics include, but are not limited to: a browser version, an operating system version a default or selected language, names or identifiers of installed toolbars, whether cookies are enabled, HTTP accept headers, screen resolution, selected time zone, names or identifiers of installed or active browser plugins (and versions of plugins), installed or selected system fonts, and the like. The client fingerprint 540 (or the information from which a client fingerprint is compiled) may be acquired using any appropriate technique, such as JAVA and AJAX web development technologies. In some implementations, the fingerprint is acquired using the techniques described in Peter Eckersley, "How Unique is your Web Browser," Electronic Frontier Foundation (2010), which is hereby incorporated by reference in its entirety.

The client fingerprint 540 is used by the media content provider to determine whether multiple media access requests have been issued by the same client device. For example, if a user deletes a cookie that was previously stored on his or her client device, the media content provider may not be able to immediately determine that a subsequent media access request was issued by that client device. Thus, the user could possibly circumvent access limits or other restrictions placed on that client device. However, the client fingerprint 540 is used to determine whether multiple requests are being issued from the same client device (or application on a client device). For example, if the media content provider detects many media access requests that are all associated with different self-describing user identifiers, but with the same client fingerprint, then the media content provider can determine that the requests are likely to be originating from the same client device, and can take appropriate remedial action (e.g., ceasing any ongoing media access by that client device, preventing future media access by that client device, etc.).

In some implementations, the media content provider considers other factors in addition to the client fingerprint 540 to determine whether multiple requests have been issued from a single client device. For example, other information in the profile 514 may help differentiate client devices. Specifically, if the client fingerprint of two different self-describing user identifiers match, but the country, IP address, and client application versions do not match, then it is relatively less likely that the requests came from the same client than when the country, IP address, and client application versions do match between the two profiles. Any appropriate combination of fields from a profile can be used to differentiate between client devices.

The IP address 542 is an IP address associated with the client. In some implementations, the IP address 542 corresponds to a "global" IP address (i.e., an IP address that allows other computers on the Internet to communicate with the client device). The "global" IP address of a client device may correspond to an IP address of the actual client device (e.g., assigned to a network communication module of the client device) or to an IP address of a router or other network device that propagates and/or manages a sub-network to which the client device is connected.

In some implementations, the IP address 542 is a "local" IP address of the client device (i.e., an IP address that allows other computers on a sub-network to communicate with the client device, but which is not directly available to other computers over the Internet).

In some implementations, the profile template 517 includes both a local IP address and a global IP address of the client, while, in other implementations, the profile template 517 includes only one or the other type of IP address.

The local application UUID 544 is a unique identifier of an application from which a media access request originated. For example, each instance of a media player/browser application that is provided by a media content provider may be assigned a universally unique identifier. When a user requests access to media content via such an application, the request may include the UUID for that application, allowing the media content provider to track which application installation requested the content.

The padding 546 is any additional text, characters, or other data that carries no informational value, but serves to ensure that the profile meets a predetermined length.

In some implementations, a profile generated in accordance with the profile template 517 takes the form of a string, such as string 518 in FIG. 5E. In some implementations the string 518 is encoded using "protobuf," a standard data interchange format.

Figure 6A:
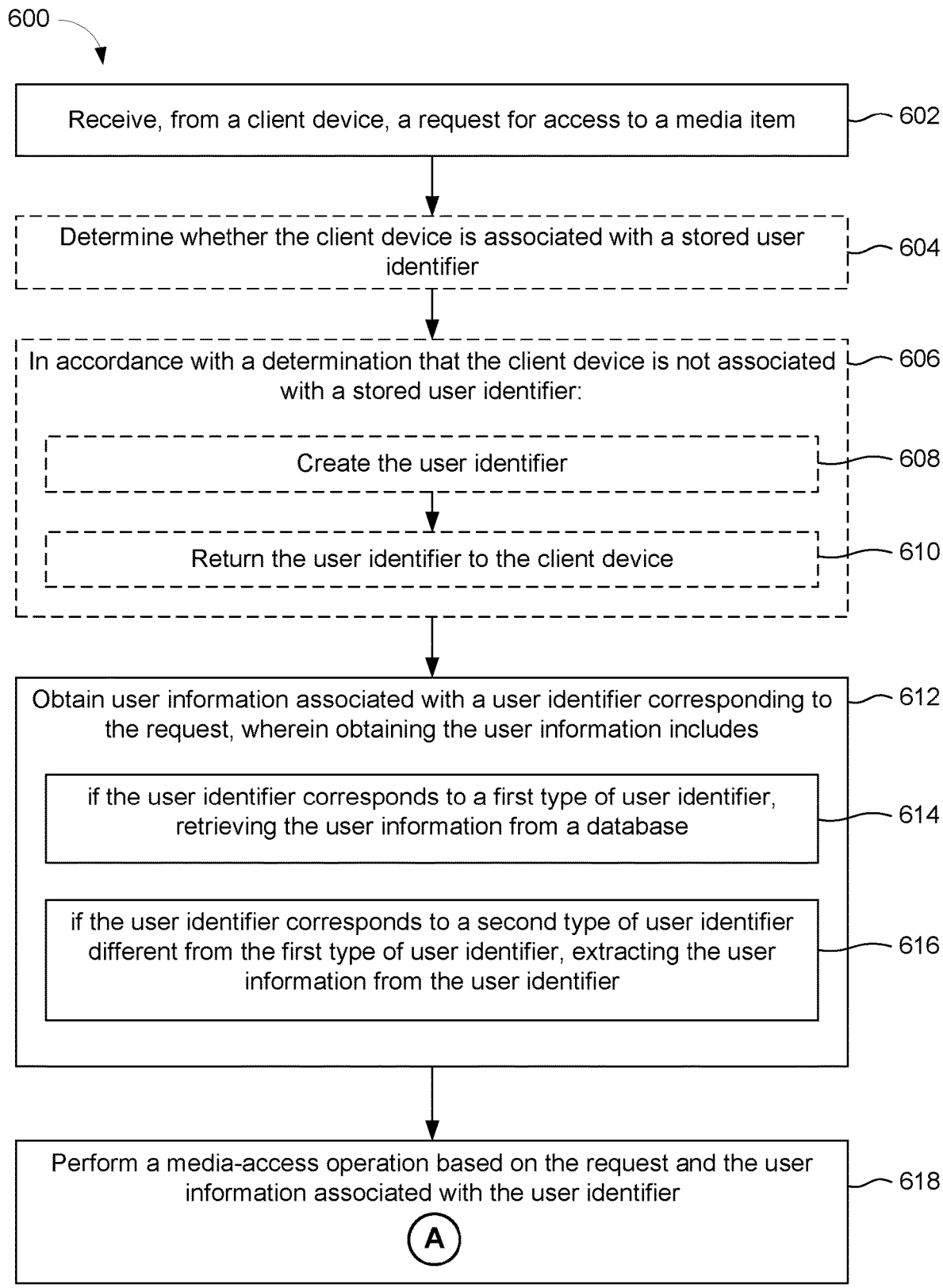
FIGS. 6A-6B are flowcharts of a method for providing access to media content, in accordance with some implementations.

Attention is directed to FIG. 6A, which is a flowchart illustrating a method 600 for providing access to media content, in accordance with some implementations. In some implementations, the method 600 is performed at an electronic device having one or more processors and memory storing one or more programs for execution by the one or more processors. In some implementations, the method 600 is performed by the access management system 120 described above with reference to FIGS. 1 and 4.

A request for access to a media item (602) is received from a client device (e.g., with the interface module 121). In some implementations, the request corresponds to execution of a link at a client device (e.g., client device 110-*n*, FIG. 1). For example, the request is sent from the client device to the access management system 120 in response to a user selecting a hyperlink (containing a URL) in a browser or other application on the client device.

It is determined (e.g., by the interface module 121) whether the client device is associated with a stored user identifier (604). For example, the access management system 120 will attempt to retrieve a cookie from the client device. As noted above, the cookie retrieved by the access management system 120 may include either a self-describing user identifier or a conventional user identifier. However, if no cookie can be retrieved, then the access management system 120 determines that the client device is not associated with a stored user identifier.

In accordance with a determination that the client device is not associated with a stored user identifier (at step 606), a self-describing user identifier is created for the client device (608) (e.g., with the account module 122), and the self-describing user identifier is returned to the client device (610) (e.g., with the interface module 121). For example, the account module 122 creates a self-describing user identifier in accordance with the techniques described above with respect to FIGS. 5A-5E, generates a cookie that includes the self-describing user identifier, and returns the cookie to the client device to be stored. More specifically, the account module 122 compiles the user information that is to be included in a self-describing user identifier, format the user information into a predetermined format (e.g., based on the data structure 507, FIG. 5B), and encodes the user information to generate the user identifier (e.g., the self-describing user identifier 506, FIG. 5A). The encoded user identifier is then included in a cookie and returned to the client device.

In some implementations, creating the user identifier at step (608) includes signing the user identifier using a hash-based message authentication code.

In some implementations, creating the user identifier at step (608) includes encrypting at least a portion of the user identifier (e.g., a profile 514, FIG. 5B).

In some implementations, creating the user identifier at step (608) includes selecting a signing key and/or an encryption key from a table (e.g., the key table 516, FIG. 5C), and including the key index corresponding to the signing/encryption keys in the user identifier.

Returning to FIG. 6A, user information associated with a user identifier corresponding to the request is obtained (612) (e.g., with the account module 122). For example, if a valid cookie containing a user identifier is retrieved from the client device, the access management system 120 uses the user identifier from the cookie to obtain user information. Exemplary techniques for obtaining user information when the user identifier is a first type (e.g., a conventional user identifier) or a second type (e.g., a self-describing user identifier) are described herein.

Specifically, obtaining the user information includes, if the user identifier corresponds to a first type of user identifier, retrieving the user information from a database (614). For example, with reference to FIG. 1, if the user identifier corresponds to a conventional user identifier, then the account module 122 retrieves the user information from the account database 123.

In some implementations, the access management system 120 (e.g., with the account module 122) determines whether the user identifier corresponds to a first type of user identifier (e.g., a conventional user identifier) by determining whether the user identifier includes fewer than a threshold number of characters (e.g., fewer than 100, 50, or 20 characters, or any other appropriate number of characters). The predetermined number of characters may correspond to a character limit imposed by the account module 122 when users select a username when registering a new account. For example, if the account module 122 limits usernames to 20 characters or less, then the account module 122 can later determine if a user identifier is a conventional user identifier by determining that the user identifier is less than or equal to 20 characters.

In some implementations, the access management system 120 (e.g., with the account module 122) determines whether the user identifier corresponds to a first type of user identifier (e.g., a conventional user identifier) by determining whether the user identifier is found in an account database (e.g., the account database 123). For example, the account module 122 may determine whether the user identifier corresponds to a username associated with an account registered with the media content provider, which would be stored and/or reflected in the account database 123. Because only conventional user identifiers are stored in the account database 123, if the user identifier is found in the database, it is necessarily a conventional user identifier.

In some implementations, the access management system 120 (e.g., with the account module 122) determines whether the user identifier corresponds to a first type of user identifier (e.g., a conventional user identifier) by determining that the user identifier does not include one or more predetermined categories of information. For example, the account module 122 may attempt to extract information from the user identifier that would only be present in a self-describing user identifier. If the account module 122 cannot extract or otherwise locate such information, then the user identifier is likely a conventional user identifier.

On the other hand, if the user identifier corresponds to a second type of user identifier (e.g., a self-describing user identifier) different from the first type of user identifier, the user information is extracted from the user identifier (616). For example, with reference to FIG. 1, if the user identifier corresponds to a self-describing user identifier, then the account module 122 extracts the user information from the self-describing user identifier itself. Extracted information includes any appropriate information, including any of the information or data described above with reference to FIGS. 5B and 5D-5E.

In some implementations, extracting the information includes extracting, from the user identifier, information that is not included in the database, and/or extracting the information includes extracting the information without requesting the information from the database.

In some implementations, the access management system 120 (e.g., with the account module 122) determines whether the user identifier corresponds to a second type of user identifier (e.g., a self-describing user identifier) by determining whether the user identifier includes more than a threshold number of characters (e.g., more than 20, 50, or 100 characters, or any other appropriate number of characters). The predetermined number of characters may correspond to a character limit imposed by the account module 122 when users select a username when registering a new account. For example, if the account module 122 limits usernames to 20 characters or less, then the account module 122 can later determine if a user identifier is a self-describing user identifier user identifier by determining that the user identifier is more than 20 characters in length.

In some implementations, the access management system 120 (e.g., with the account module 122) determines whether the user identifier corresponds to a second type of user identifier (e.g., a self-describing user identifier) by determining whether the user identifier is found in an account database (e.g., the account database 123). For example, the account module 122 may determine whether the user identifier corresponds to a username associated with an account registered with the media content provider, which would be stored and/or reflected in the account database 123. Because only conventional user identifiers are stored in the account database 123, if the user identifier is not found in the database, it is likely to be a self-describing user identifier.

In some implementations, the access management system 120 (e.g., with the account module 122) determines whether the user identifier corresponds to a second type of user identifier (e.g., a self-describing user identifier) by determining that the user identifier includes one or more predetermined categories of information. For example, the account module 122 may attempt to extract information from the user identifier that would only be present in a self-describing user identifier. If the account module 122 is able to extract or otherwise locate such information, then the user identifier is likely a self-describing user identifier.

A media access operation is performed based on the request and the user information associated with the user identifier (618). In some implementations, performing the media access operation includes authorizing provision of content to the client device based at least in part on the user information associated with the user identifier. For example, if the request is associated with a registered and/or paying user, the access management system 120 will allow the client device to access the requested media content. In such circumstances, the access management system 120 may initiate a streaming media session with the client device to deliver the requested content. Alternatively, the access management system 120 may initiate a download of the requested media content item to the client device. Any technique for providing, allowing, and/or enabling access to the requested media content is contemplated.

Figure 6B:
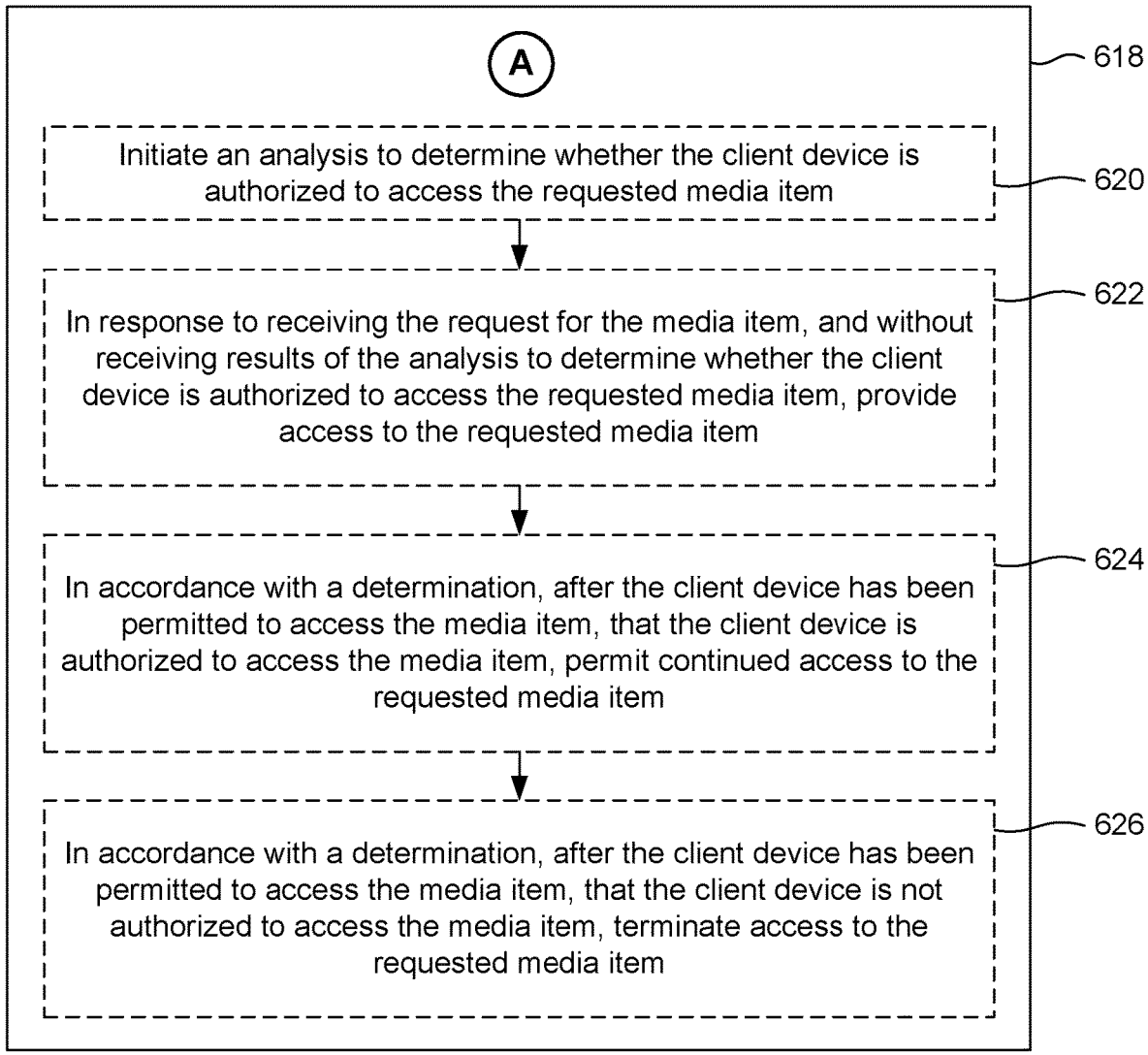

As described above, in some implementations, the access management system 120 allows or enables access to media content after receiving the request at step (602), but before determining whether the client device is actually entitled to receive the media content. Once the access management system 120 determines whether the client is entitled to receive the requested media content (e.g., with the access limit evaluation module 128), it then either revokes, prevents, or otherwise terminates the client's access to the media content (e.g., if access limits are exceeded or attempts have been made to circumvent the limits), or it takes no action and allows the user to continue to access the content. Accordingly, the access management system 120 evaluates access limits asynchronously from the provision of media content. Specifically, with reference to FIG. 6B, in some implementations, performing the media access operation at step (618) includes initiating an analysis to determine whether the client device is authorized to access the requested media item (620) (e.g., with the media module 124). Specifically, once the media module 124 receives a request for media content, it will communicate with the appropriate modules of the access management system 120 (e.g., the access limit evaluation module 128) to request information about the access limits that will govern or otherwise affect that request.

In response to receiving the request for the media item, and without receiving results of the analysis to determine whether the client device is authorized to access the requested media item, access to the requested media item is provided (622) (e.g., with the media module 124).

In accordance with a determination, after the client device has been permitted to access the media item at step (622), that the client device is authorized to access the media item, continued access to the requested media item is permitted (624). On the other hand, in accordance with a determination, after the client device has been permitted to access the media item at step (622), that the client device is not authorized to access the media item, access to the requested media item is terminated (626) (e.g., with the media module 124).

As described above, the media access operation includes limiting media access by the client device based on one or more factors. For example, if a request is associated with an anonymous user (or any user who is subject to media access limits, whether anonymous or registered), and the user has reached a media access limit (e.g., a threshold number of media access requests in a certain time), as determined by the access limit evaluation module 128, then the access management system 120 will revoke, prevent, or otherwise terminate the client's access to the requested media content.

As noted above, in some circumstances, the media access operation includes limiting media access by the client device based on one or more usage heuristics. In particular, in response to determining that the user identifier corresponds to a second type of user identifier (e.g., a self-describing user identifier) at step (616), the access management system 120 (e.g., with the access limit evaluation module 128) determines whether the self-describing user identifier is likely to be associated with a user who is trying to circumvent access limits. Exemplary usage heuristics follow.

In some implementations, when a media access request is received, the access limit evaluation module 128 searches the consumption data database 129 to determine whether a client fingerprint (e.g., client fingerprint 540 from the self-describing user identifier associated with the media access request) is associated with a threshold number of media access requests. The threshold value may be an absolute number of requests, or a rate of requests (e.g., a certain number of requests within a certain time period). In some implementations, the threshold value is 2, 3, 4, 5, 10, or any other appropriate number, and the time period is 1 minute, 2 minutes, 5 minutes, 10 minutes, 1 hour, or any other appropriate duration.

Accordingly, clients who deleted or modified their cookies in order to circumvent access limits can be identified based on the uniqueness of their client fingerprint. Specifically, even if a user repeatedly deletes his or her browser cookies, which would cause the access management system 120 to generate a new self-describing user identifier for each request, the access management system 120 can still determine that the requests are originating from the same client device.

As noted above, in some implementations, the client fingerprint is used in conjunction with one or more additional fields of the profile 514 to determine whether requests originated from the same or different client devices. For example, if multiple access requests (and/or media access events, such as successful downloads or streaming sessions) are associated with the same client fingerprint, the access limit evaluation module 128 determines the extent to which additional fields of the profiles match. Thus, if multiple requests have the same client fingerprint but no other fields in common, then the access limit evaluation module 128 will determine that the requests did not originate from the same client device, and, unless other access limits apply, will allow access to the requested media content item. On the other hand, if multiple requests have the same client fingerprint and also have one or more other fields in common (e.g., the same IP address 542, the same country 526, etc.), then the access limit evaluation module 128 will determine that the requests likely originated from the same client device, and will revoke, prevent, or otherwise terminate the user's access.

In some implementations, the access limit evaluation module 128 analyzes the consumption data database 129 to identify batch downloading patterns associated with a client device that issued an access request. Specifically, the access limit evaluation module 128 determines whether a large number of sequential or temporally proximate downloads or media access events are associated with the same self-describing user identifier or client fingerprint. In some implementations, the access limit evaluation module 128 differentiates between valid listening of long playlists and unauthorized batch downloads. Specifically, recurring jumps (e.g., skipping the playback of an audio track ahead slightly or skipping between tracks in a playlist) are taken as an indication of unauthorized access attempts since recurring jumps in the music stream can trigger faster downloads of the media content than would be possible if the client were only streaming the media content for real-time consumption. If batch downloading by a client is detected, the access limit evaluation module 129 will revoke, prevent, or otherwise terminate the user's access.

In some implementations, the access limit evaluation module 128 analyzes the consumption data database 129 to identify inconsistencies between a geographic location in a given user identifier and a geographic location associated with a corresponding request. Specifically, in some implementations, the self-describing user identifier includes a geographic location field (e.g., country 526). Thus, when an anonymous client device first accesses the media content provider, it will be given a self-describing user identifier that identifies a specific geographical location. If the client device is moved to a different geographical location, however, the location in the self-describing user identifier will not match the geographical location of subsequent requests. (As described above, the geographical location of a client device can be determined based on the IP address of the device, which would likely change when the client changes geographical locations.)

In some cases, inconsistencies between the determined geographical location of a client device and the geographical location identified in the client's self-describing user identifier can be the valid result of a user enabling or disabling a virtual private network ("VPN"). However, if it happens too frequently (e.g., more frequently than would be expected for a user to be enabling or disabling a VPN) or if the self-describing user identifier originates from different geographical locations at the same time, then the request is likely to correspond to an unauthorized access attempt. If such geographical inconsistencies are detected, the access limit evaluation module 129 will revoke, prevent, or otherwise terminate the user's access.

In some implementations, the access limit evaluation module 128 analyzes the consumption data database 129 to identify instances where several different media access requests, each associated with a unique fingerprint (e.g., the client fingerprint 540), have originated from the same IP address. For example, a user may attempt to acquire faster media downloads (as compared to streaming for real-time consumption) by pretending to be several different clients at once. This may be done by modifying the client environment so that the same client environment results in a different fingerprint. As one example, the user may use a different browser when issuing a subsequent media access request, or may change browser parameters (e.g., extensions, toolbars, etc.), so that the client fingerprint 540 will be different for the same client device. However, because the requests all originate from the same client device, they will likely all be associated with the same IP address.

In some implementations, the access limit evaluation module 128 differentiates between circumstances where a user has modified the client environment to circumvent media limits, and where multiple valid clients are behind a network address translation ("NAT") firewall. For example, a home wired or wireless network may have multiple computers on a sub-network, all of which are connected to the Internet through a single device that has only one IP address (e.g., a cable modem). Thus, if multiple client devices on the sub-network issue media access requests, they will all appear to the access limit evaluation module 128 to have originated from the same IP address. However, as noted above, it is sometimes possible to identify the local IP address of the client (e.g., if the request originated from a JAVA applet or a locally installed application). The local IP address, if identified, is part of the self-describing user identifier, and is used to better differentiate between a large set of valid clients behind a NAT firewall and a single client pretending to be many clients at once. Specifically, if the access limit evaluation module 128 identifies multiple requests with different client fingerprints, but a common global IP address, it can then look to the local IP addresses of the requests. If they are the same for each request, then it is likely that the requests came from the same client device, and the user is attempting to circumvent access limits. Accordingly, the access limit evaluation module 129 will revoke, prevent, or otherwise terminate the user's access. If each request has a different local IP address, then it is likely that the requests each originated from a different device behind a NAT firewall or other device.

In some implementations, the access limit evaluation module 128 analyzes the consumption data database 129 to identify multiple requests that are all associated with a single client application UUID (e.g., the client application UUID 544), even though other aspects of the profile 514 are different (e.g., IP address, client fingerprint, etc.). If the access limit evaluation module 128 identifies a threshold number of requests (e.g., 2, 5, 10, 100 requests) that are associated with self-describing user identifiers that each have the same local application UUID, this is indicative of a client device attempting to circumvent access limits. Accordingly, the access limit evaluation module 129 will revoke, prevent, or otherwise terminate the user's access.

Figure 7:
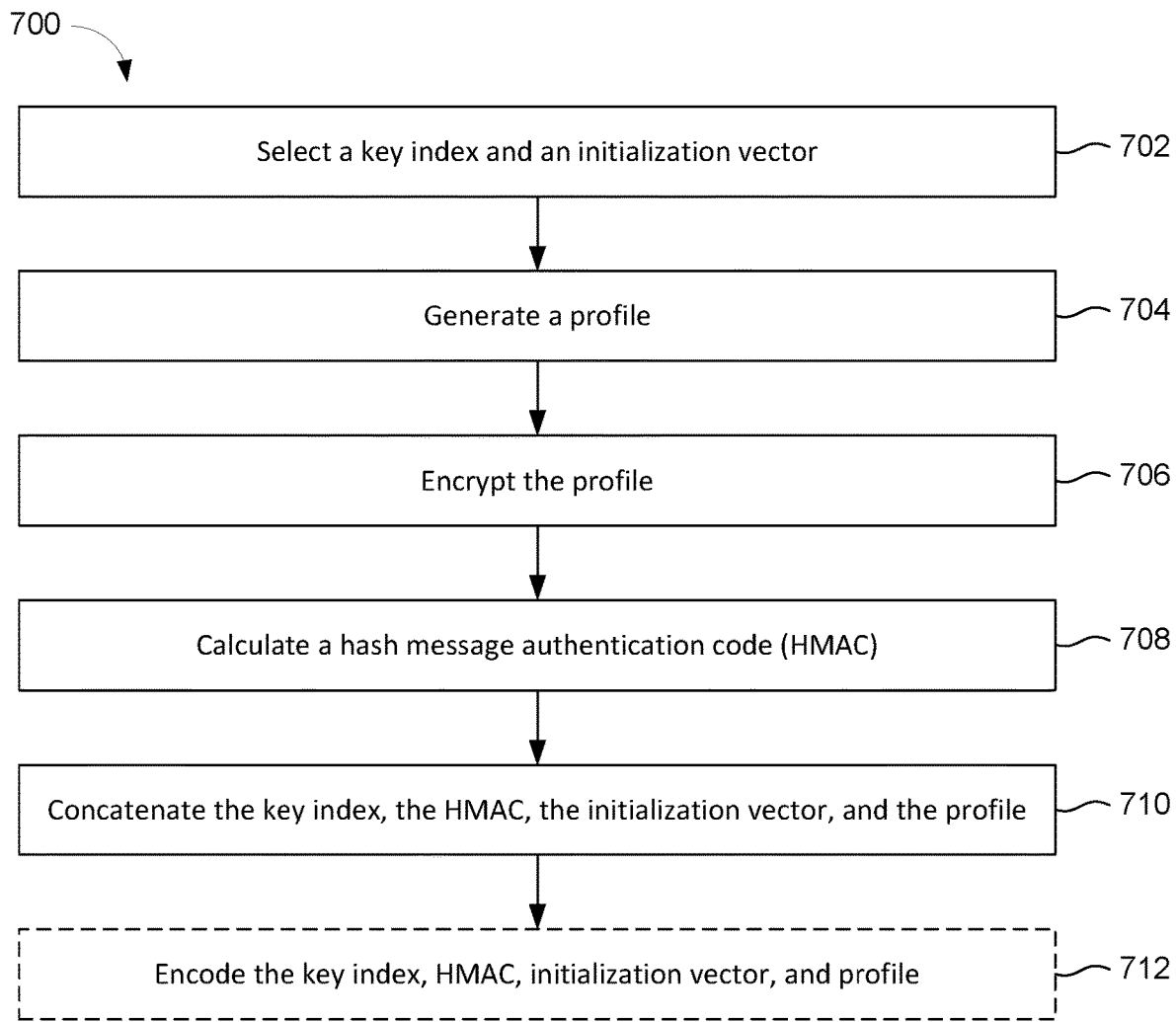
FIG. 7 is a flowchart of a method for generating a self-describing user identifier, in accordance with some implementations.

Attention is directed to FIG. 7, which is a flowchart illustrating a method 700 for generating a self-describing user identifier, in accordance with some implementations. In some implementations, the method 700 is performed at an electronic device having one or more processors and memory storing one or more programs for execution by the one or more processors, the method comprising. In some implementations, the method 700 is performed by the account module 122 described above with reference to FIGS. 1 and 4. The method 700 generates a self-describing user identifier in accordance with the self-describing user identifier described with respect to FIGS. 5A-5E.

A key index and initialization vector are selected (702). In some implementations, the key index and initialization vector are selected at random (or pseudo-randomly). For example, the initialization vector may be an output from a random or pseudo-random string generator, and the key index may be an output from a random or pseudo-random number generator. On the other hand, the key index may be selected according to a sequential order (or any other appropriate order). For example, the account module 122 may simply proceed through the key index sequentially.

A profile (e.g., the profile 514) is generated (704). The profile includes information such as a country of residence, a client fingerprint, applicable licenses, local/global IP addresses, a referrer URL, and the like. If necessary, random or null bytes are added to the profile to ensure that the self-describing user identifier reaches a minimum size when it is encoded.

The profile is encrypted using the initialization vector and an encryption key corresponding to the selected key index (706). In some implementations, the encryption is AES encryption.

A hash message authentication code ("HMAC") is calculated using an HMAC key corresponding to the selected key index (708). In some implementations, the HMAC is truncated.

The key index, the HMAC, the initialization vector, and the profile are then concatenated (710).

In some implementations, the concatenated key index, HMAC, initialization vector, and profile are encoded to generate a self-describing user identifier (712). In some implementations, the encoding includes Base32 or Base64 encoding, or any other suitable encoding method.

It should be understood that the particular order in which the operations in FIGS. 6-7 have been described is merely exemplary and is not intended to indicate that the described order is the only order in which the operations could be performed. One of ordinary skill in the art would recognize various ways to reorder the operations described herein. For brevity, these details are not repeated here.

Plural instances are, optionally provided for components, operations, or structures described herein as a single instance. Finally, boundaries between various components, operations, and data stores are somewhat arbitrary, and particular operations are illustrated in the context of specific illustrative configurations. Other allocations of functionality are envisioned and optionally fall within the scope of the implementation(s). In general, structures and functionality presented as separate components in the example configurations are, optionally, implemented as a combined structure or component. Similarly, structures and functionality presented as a single component are, optionally, implemented as separate components. These and other variations, modifications, additions, and improvements fall within the scope of the implementation(s).

It will also be understood that, although the terms "first," "second," are, in some circumstances, used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" is, optionally, construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter is, optionally, practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for providing access to media content from a media content provider, performed at an electronic device having one or more processors and memory storing one or more programs for execution by the one or more processors, the method comprising:
   receiving, from a client device, a request for access to a media item, wherein the request for access includes a self-describing user-identifier;
   in response to the request for access to the media item:
      initiating an analysis to determine whether the client device is authorized to access the media item, the analysis including an examination of a media consumption log associated with the client device, wherein the media consumption log stores data representing self-describing user-identifiers;
      wherein the analysis includes, based on the examination of the media consumption log, detecting multiple requests from different self-describing user identifiers corresponding to the client device to determine whether the client device has reached an access limit; and
   in accordance with a determination that the client device has reached the access limit, terminating access to the media item.

2. The method of claim 1, wherein determining whether the client device has reached an access limit includes differentiating between client devices by determining whether the request for access to the media item originates from a geographic location that matches geographic locations of the multiple requests from the different self-describing user identifiers.

3. The method of claim 2, wherein differentiating between client devices includes determining that it is less likely that the request came from a same client device when a country, IP address, or client application version of the request does not match the multiple requests as compared to when the country, IP address, or client application version does match.

4. The method of claim 1, wherein the client device is associated with an anonymous user.

5. The method of claim 1, wherein the self-describing user identifier is stored on the client device and deleted from the client device before initiating the analysis.

6. The method of claim 1, wherein asynchronously providing access to the media item to the client device is performed before receiving results of the analysis to determine whether the client device is authorized to access the media item.

7. The method of claim 1, wherein:
   the request is received from an instance of an application on the client device; and
   the request includes a local-application universally unique identifier (UUID) assigned to the instance of the application on the client device.

8. The method of claim 7, wherein the local-application UUID included in the request is used in the analysis to determine whether the client device is authorized to access the media item.

9. The method of claim 8, wherein the analysis to determine whether the client device is authorized to access the media item comprises identifying, based on the media consumption log, whether a number of different user identifiers using the same local-application UUID satisfies a threshold.

10. The method of claim 1, wherein each respective self-describing user identifier is generated by a media content provider for a respective client device of a respective user that is not logged in to the media content provider, the multiple requests including a same local-application universally unique identifier (UUID), wherein a local-application UUID is assigned to each instance of an application from which at least one request of the multiple requests originates.

11. The method of claim 1, wherein a respective self-describing user identifier includes one or more fields selected from a group consisting of:
a country identifier;
a product identifier;
a referrer identifier;
a time stamp;
an identifier of a license associated with the client device;
an advertisement permission indicator;
a version number associated with a client application;
a fingerprint corresponding to the client device; and
a local IP address.

12. An electronic device, comprising:
one or more processors; and
memory storing one or more programs for execution by the one or more processors, the one or more programs including instructions for:
receiving, from a client device, a request for access to a media item, wherein the request for access includes a self-describing user-identifier;
in response to the request for access to the media item:
initiating an analysis to determine whether the client device is authorized to access the media item, the analysis including an examination of a media consumption log associated with the client device, wherein the media consumption log stores data representing self-describing user-identifiers;
asynchronously providing access to the media item while performing the analysis,
wherein the analysis includes, based on the examination of the media consumption log, detecting multiple requests from different self-describing user identifiers corresponding to the client device to determine that the client device has reached an access limit; and
in accordance with a determination, after the client device has been provided to access the media item, that the client device has reached the access limit, terminating access to the media item.

13. A non-transitory computer-readable storage medium storing one or more programs executable by an electronic device with one or more processors, the one or more programs comprising instructions for:
receiving, from a client device, a request for access to a media item, wherein the request for access includes a self-describing user-identifier;
in response to the request for access to the media item:
initiating an analysis to determine whether the client device is authorized to access the media item, the analysis including an examination of a media consumption log associated with the client device, wherein the media consumption log stores data representing self-describing user-identifiers;
asynchronously providing access to the media item while performing the analysis,
wherein the analysis includes, based on the examination of the media consumption log, detecting multiple requests from different self-describing user identifiers corresponding to the client device to determine that the client device has reached an access limit; and
in accordance with a determination, after the client device has been provided to access the media item, that the client device has reached the access limit, terminating access to the media item.

* * * * *